April 2, 1963     H. W. SMITH     3,083,949
TENSION DEVICE

Filed Oct. 12, 1960     4 Sheets-Sheet 1

FIG. I

INVENTOR:
HOYT W. SMITH
BY John F. Schmidt

April 2, 1963  H. W. SMITH  3,083,949
TENSION DEVICE

Filed Oct. 12, 1960  4 Sheets-Sheet 3

INVENTOR:
HOYT W. SMITH
BY John F. Schmidt

April 2, 1963   H. W. SMITH   3,083,949
TENSION DEVICE

Filed Oct. 12, 1960   4 Sheets-Sheet 4

INVENTOR:
HOYT W. SMITH
BY John F. Schmidt

United States Patent Office 3,083,949
Patented Apr. 2, 1963

3,083,949
TENSION DEVICE
Hoyt W. Smith, Longview, Tex., assignor to LeTourneau-Westinghouse Company, Peoria, Ill., a corporation of Illinois
Filed Oct. 12, 1960, Ser. No. 62,281
9 Claims. (Cl. 254—164)

This invention relates to a tension device for a cable system, and more specifically, the invention relates to a tension device for a cable system in which two machine elements are moved relative to each other through a repeating cycle which includes a forward and reverse stroke, and the cable effects the relative movement through the forward stroke and also through the reverse stroke.

There are many cable systems in industry in which a cable moves something through a stroke and in so doing, stores work in a spring; the work thus stored in the spring is taken out of the spring on the return stroke. There are other cable systems in which the thing to be moved is moved in both directions positively by the cable. This invention relates to cable systems of the latter type.

Cable systems of the second type referred to have an advantage over the first type in that the thing to be moved is moved positively by the cable. Such systems have a disadvantage in that the cable gradually lengthens during use and becomes slack, and if no means are provided to keep the cable tight and thus take up the slack, there is danger of breaking the cable. Various cable tightening means have been provided in the past for cable systems of this type, but they have the disadvantage of requiring the attention periodically of a maintenance man. It is desirable to provide means for keeping such a cable tight without requiring frequent servicing by a maintenance man.

It is accordingly an object of this invention to provide a tension device to keep the cable tight in a cable system in which the cable positively moves two machine elements relative to each other through a forward stroke and through a reverse stroke, the tension device being substantially automatic, with a bare minimum of attention by maintenance personnel. This and other objects are accomplished by a cam mechanism in which the cam driver is resilient and yieldable so as to provide no further tightening effort as soon as the cable tension reaches a predetermined value.

Figure 1:
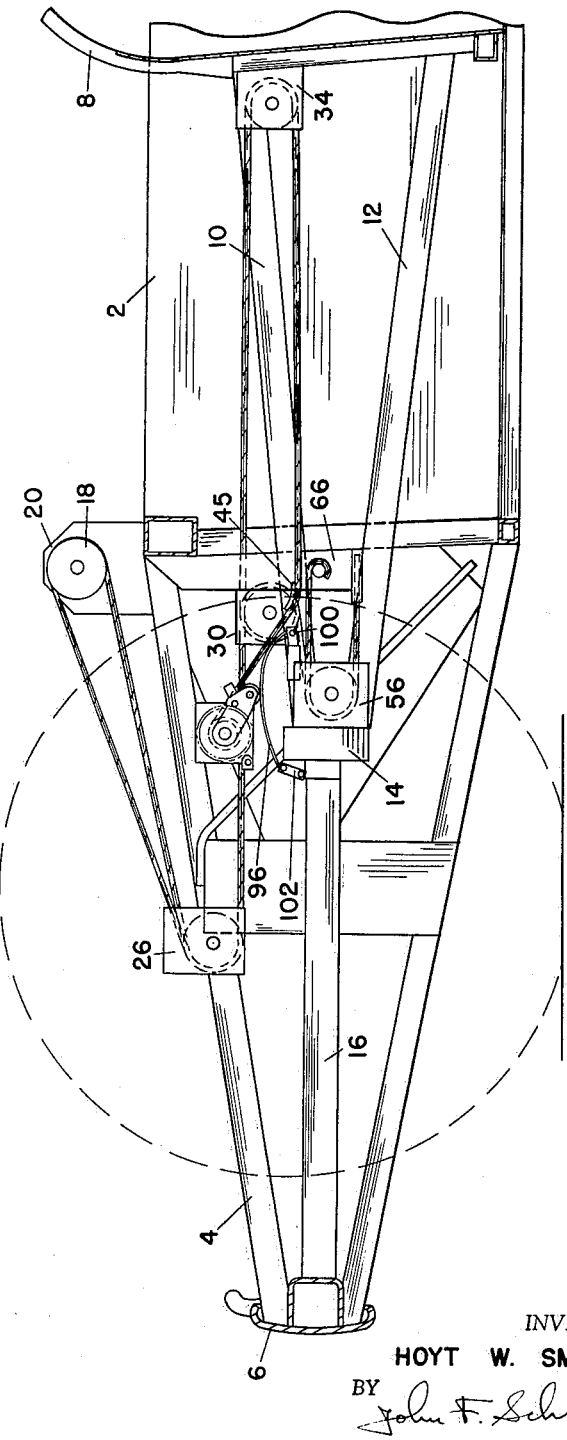
FIG. 1 is a somewhat schematic side elevation view, with parts broken away, of a machine using a cable system of the type here described. The machine shown is what is commonly known in the earthmoving art as a scraper.

Those skilled in the art of earthmoving will recognize the machine shown in FIG. 1 as a carrying type scraper having a bowl 2, a pusher frame 4 secured to the rear of the bowl 2, and a push plate 6 at the rear of the pusher frame 4. The bowl 2 and the framework 4 to the rear of the bowl provide the basic support for the cable system to which this invention applies, and these structural parts will be understood to constitute a support generally.

A tailgate and its operating mechanism are carried by the support, the tailgate being indicated at 8 and being movable forward and back in the scraper bowl 2. A tailgate operating frame is secured to the rear of the tailgate and as shown here comprises a pair of arms 10 and 12 which converge toward the rear where they are secured at their ends to a sheave block 14. Sheave block 14 reciprocates, right and left as seen in FIG. 1, on a rail 16. It will be understood that the two arms 10 and 12 are below the plane of the paper and that there is another pair of like arms above the plane of the paper.

Figure 4:
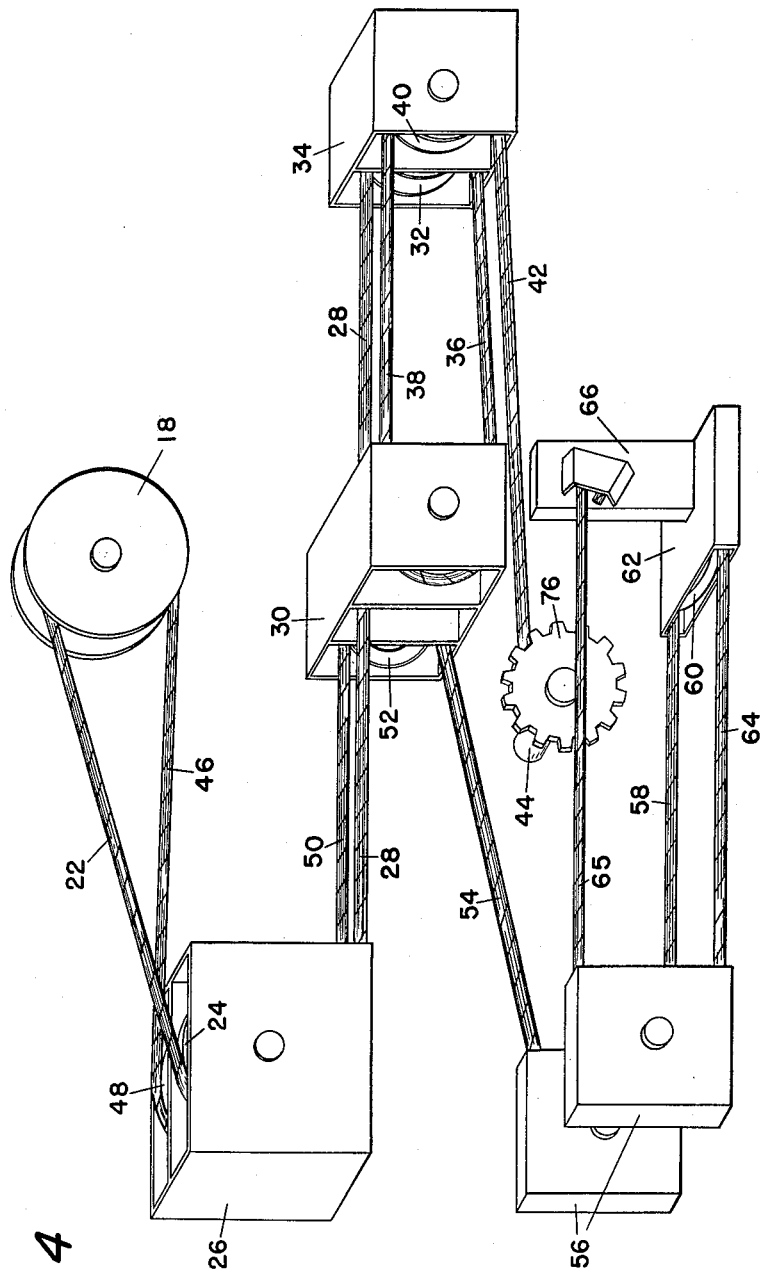
FIG. 4 is an exploded schematic view showing the cable system apart from the details of the machinery to which it is applied in FIG. 1.

A cable system is provided to move the tailgate 8, the arms 10 and 12, and the sheave block 14 to the right relative to the support, in what may be called a forward stroke, and to the left in a return stroke. For a better understanding of this cable system, reference may be had to FIGS. 1 and 4 together. As there shown, a cable drum 18 is connected to be driven by an electric motor 20. Motor 20 is one of a type which is easily reversible and runs as well in one direction as in the other.

Although the two runs of cable shown in connection with drum 18 may actually be all one piece of cable having several wraps around the drum 18, as a matter of practical convenience, the two runs of cable here shown are preferably separate pieces of cable, each of which is dead-ended on the spool or drum 18. Taking now the upper run 22 of the cable first, this run of the cable passes around near sheave 24 in a sheave housing 26, leaving the sheave housing in a length which may be here designated as 28. The length of cable 28 passes straight through the middle section of a sheave housing 30, extending forward of the sheave housing and wrapping around the far sheave 32 carried by a sheave housing 34. As can readily be seen in FIG. 1, sheave housings 26 and 30 are mounted on the body or basic support of the system, while the sheave housing 34 is secured to the back of the tailgate 8. As described above, cable length 28 enters sheave housing 34, wraps around sheave 32, and leaves sheave housing 34 as a length of cable which may here be designated as 36.

In sheave housing 30, the cable wraps around the near sheave and leaves sheave housing 30 as a length of cable here designated as 38. The length of cable 38 enters sheave housing 34, wrapping around the near sheave 40, and leaves sheave housing 34 as a length of cable designated as 42. This cable length moves toward the rear to a spool 44, on which the cable is dead-ended. As is best seen in FIG. 1, in the embodiment here shown, cable length 42 passes under a cable guide 45 which slants the cable upward toward spool 44.

Returning now to the motor driven drum 18, the lower run 46 of the cable may now be traced through the system. This run 46 enters the sheave housing 26 and wraps around the far sheave 48, leaving the sheave housing as a cable length 50. Cable length 50 wraps around the far sheave 52 in sheave housing 30, leaving sheave housing 30 as cable length 54. The cable length 54 enters the rear sheave housing 56 which is carried on block 14 referred to above and shown in FIG. 1. The cable wraps around a sheave on the far side and leaves sheave housing 56 as a cable length 58. The cable length 58 extends forward where it wraps around a sheave 60 in a sheave housing 62, leaving the sheave 60 and extending rearward as a cable length 64. Cable length 64 wraps around the near sheave in sheave housing 56, leaving the housing 56 as cable length 65, which extends forward and is dead-ended on a block 66 which is carried by the main support of the system. As here shown, the block 66 and the sheave housing 62 are secured together and the assembly is carried by the main frame of the system.

Reference was made above to the fact that the cable is dead-ended on a spool 44. The spool 44 is shown on a larger scale in FIGS. 2 and 3, especially in FIG. 3. As there shown, the spool 44 consists of a shaft 68 which is rotatable in a housing 70. Inside the housing 70, flanges 72 and 74 are secured in any suitable manner to the shaft 68, and in effect, make a spool of the portion of the shaft 68 which is between the flanges. As is probably best seen in FIG. 2, the cable passes through an opening in the shaft 68, and is secured in the opening in any suitable manner.

Outside the housing 70, the shaft 68 is provided with a toothed wheel 76. Wheel 76 is secured in any suitable manner to the shaft so that driving or rotation of toothed wheel 76 rotates the shaft 68.

Figure 2:
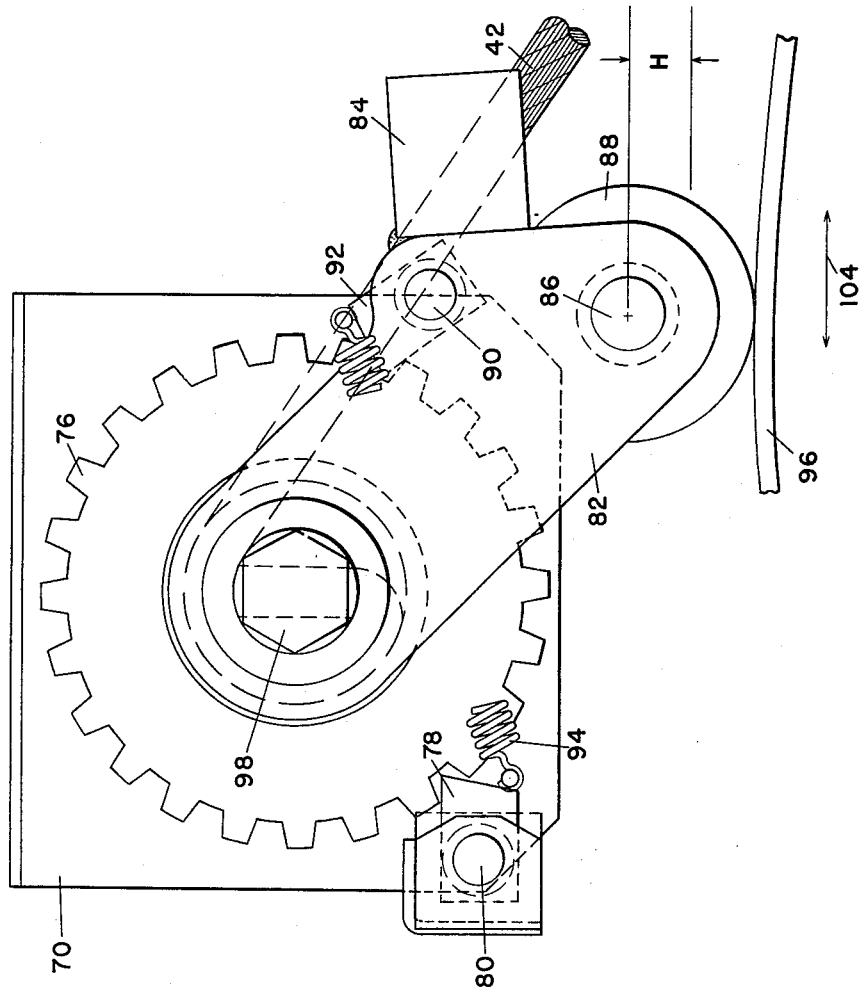
FIG. 2 is a view similar to that of FIG. 1, but showing only a portion of the mechanism and on a much larger scale.
Figure 3:
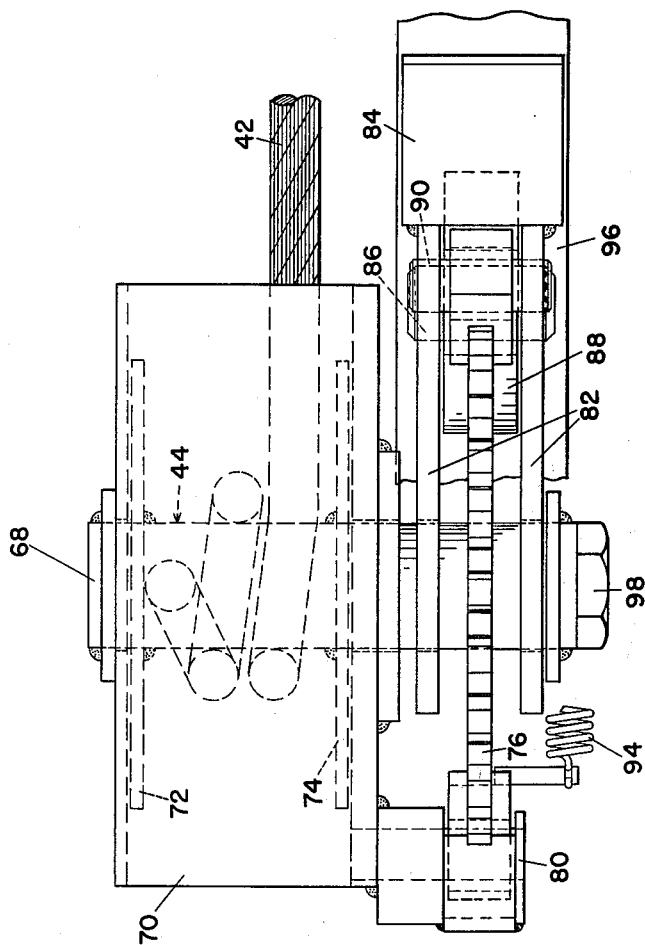
FIG. 3 is a top plan view of the portion of the invention shown in FIG. 2.

Toothed wheel 76 is part of a ratchet means which is provided to keep the cable tight. A holding pawl 78 is pivotally mounted on the outside of the housing 70 as shown at 80. An actuator is provided to move the ratchet wheel or toothed wheel 76 and its connected shaft 68 in order to tighten the cable. More specifically, the actuator comprises an arm 82 which is pivotally mounted on the shaft 68. As is best seen in FIG. 3, arm 82 is a bifurcated member of which the two parts extend on opposite sides of the toothed wheel 76. A weight 84 biases the arm 82 clockwise or downward as seen in FIG. 2. Between the bifurcated members of the arm 82, there is secured a shaft 86 on which a roller 88 is rotatably mounted. The bifurcated parts of arm 82 further carry another shaft 90 on which a second pawl 92 is pivotally mounted in close proximity to the toothed wheel 76 and engageable with the teeth thereof. A suitable spring 94 is provided to bias the two pawls 78 and 92 into engagement with the teeth of toothed wheel 76. In the embodiment shown, the spring 94 is secured at its one end to the pawl 78 and at its other end to the pawl 92; thus, spring 94 serves to bias both of the pawls into engagement with the toothed wheel.

The roller 88 and its associated arm 82 provide the cam follower of a cam means, for which the cam or driver is shown at 96. As will be understood by those skilled in the art, the cam mechanism here shown must provide for a minimum rise shown as H in FIG. 2 to provide the necessary movement of the toothed wheel 76 to permit engagement by pawl 78 of the next adjacent tooth in order that the second pawl 92 may drop down under the influence of weight 84 and engage a new tooth for its next stroke. In order to permit initial tightening of the cable when the system is first assembled, and in order to permit release of the holding pawl 78 for maintenance purposes, the ratchet mechanism here shown has a hexagonal piece 98 secured in any suitable manner to shaft 68.

The cam or cam driver 96 shown in FIG. 2 is a yieldable device; as is best seen in FIG. 1, cam 96 is an elongated leaf spring secured at its forward end in any suitable manner as by the pin 100 and its rearward end by a spring shackle 102.

Point of attachment 100 for spring 96, and spring shackle 102 are carried by the assembly of mechanism at the rear end of the tailgate operating structure. This assembly is a sort of carriage which rides back and forth on the rail 16 shown in FIG. 1. As is clearly indicated there, the long axis of spring 96, and a line drawn from spring shackle 102 to the forward point of attachment 100, are substantially parallel to the direction of motion and substantially perpendicular to the measurement H in FIG. 2. Thus the cam 96 moves in the direction of the double-headed arrow shown at 104, FIG. 2. However, it will be noted that the direction of resilience of the leaf spring 96 is perpendicular to the double-headed arrow 104, namely in the same direction as the direction in which the dimension H, FIG. 2, is measured.

*Operation*

As the tailgate 8 and its push frame structure move back and forth (forward and reverse) under the influence of the cable driven by the cable drum 18, the cam 96 engages the cam follower 88 on each forward stroke and on each return stroke. If the cable is slack, the cam (or driver) 96 moves the roller and its connected arm 82 through the necessary distance H in order to permit pawl 78 to engage the next adjacent tooth and allow the pawl 92 to engage a new tooth after the arm 82 drops down when the cam 96 is disengaged from the cam follower.

If the cable is sufficiently tight—i.e., is already under a predetermined maximum tension—then engagement between cam 96 and cam follower 88 will merely accomplish elastic deformation of the cam or leaf spring 96 in a direction substantially perpendicular to its forward and reverse direction of motion. Thus, when the cable already has sufficient tension, no excessive tension in the cable is provided by the automatic tightener. Instead, the yieldable cam merely deflects under the cam follower as the structure carrying the cam moves forward and back.

It will be seen from the foregoing that this invention provides automatic means for maintaining the proper tension in a cable system. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. In a machine having at least two relatively movable elements and a cable system connected to effect relative movement of said elements in a repeating cycle, a tension device for said system comprising: a member having movable parts and engaging the cable of the system to tighten the cable upon actuation of the movable parts; an actuator connected to actuate the movable parts; and resilient means movable to engage the actuator during each cycle and yieldable when the cable is already tight.

2. In a machine having at least two relatively movable elements and a cable system connected to effect relative movement of said elements in a repeating cycle, a tension device for said system comprising: means in engagement with the cable and actuable to tighten the cable; an actuator for the tightening means; and resilient means movable to engage the actuator during each cycle and yieldable when cable tension reaches a predetermined value.

3. In a machine having at least two relatively movable elements and a cable system connected to effect relative movement of said elements in a repeating cycle a tension device for said system comprising: means in engagement with the cable and actuable to tighten the cable; an actuator for the tightening means; and resilient means movable to engage the actuator during each cycle to operate the actuator to tighten the cable and yieldable when cable tension reaches a predetermined value.

4. In a machine having at least two relatively movable elements and a cable system connected to effect relative movement of said elements in a repeating cycle, a tension device for said system comprising: means in engagement with the cable and actuable to tighten the cable; an actuator for the tightening means; and an arched leaf spring movable to engage during each cycle the actuator to operate the actuator to tighten the cable and elastically displaceable by diminution of the arch when cable tension reaches a predetermined value.

5. In a machine having at least two relatively movable elements and a cable system connected to effect relative movement of said elements in a repeating cycle, a tensioning device for said system comprising: means in engagement with the cable and actuable to tighten the cable; a cam follower movable to actuate the tightening means; and a cam to move the cam follower and comprising an arched leaf spring movable to engage the follower during each cycle to move the follower to tighten the cable and yieldable when cable tension reaches a predetermined value.

6. A tension device for a cable system connected to provide repetitive relative movement between at least two machine elements, in a repeating cycle, each cycle including a forward stroke and a reverse stroke, the device comprising: means in engagement with the cable and actuable to tighten the cable; an actuator for the tightening means; and an arched leaf spring having movement relative to the actuator engageable with the actuator during each cycle to operate the same to tighten the cable and elastically displaceable by diminution of the arch when cable tension reaches a predetermined value.

7. A tension device for a cable system having a rotatable spool, a cable dead-ended on the spool, and a member moved by the cable relative to the spool through a repeating cycle which includes a forward stroke and a reverse stroke, the device comprising: a toothed wheel connected to turn the spool to tighten the cable; a pivotally mounted cam follower engageable with the toothed wheel and pivotable to turn the spool and tighten the cable; and a cam engageable with the cam follower during each cycle, the cam comprising an arched leaf spring.

8. A tension device for a cable system having a rotatable spool, a cable dead-ended on the spool, and a member moved by the cable relative to the spool through a repeating cycle which includes a forward stroke and a reverse stroke, the device comprising: a toothed wheel connected to turn the spool to tighten the cable; a pivotally mounted cam follower engageable with the toothed wheel and pivotable to turn the spool and tighten the cable; and a cam engageable with the cam follower during each cycle, the cam comprising an elongated arched leaf spring having one end pivotally mounted directly on the moved member and its other end mounted on the moved member by means of a spring shackle, whereby the spring is elastically deformable when cable tension reaches a predetermined value.

9. In a machine having at least two relatively movable elements and a cable system connected to effect relative movement of said elements in a repeating cycle, a tension device for said system comprising: means in engagement with the cable and actuable to tighten the cable; a cam follower connected to the tightening means and movable through a given minimum cam height to effect cable tightening; and a resilient cam driver movable to engage the follower during each cycle to lift the follower through said minimum height to tighten the cable and elastically deformable by the cam follower when cable tension reaches a predetermined value.

References Cited in the file of this patent
UNITED STATES PATENTS

| | | |
|---|---|---|
| 2,650,713 | Nigh | Sept. 1, 1953 |
| 2,846,788 | Vance | Aug. 12, 1958 |
| 2,946,563 | Eaton | July 26, 1960 |